(12) United States Patent
Sprague (10) Patent No.: US 11,187,323 B2
(45) Date of Patent: Nov. 30, 2021

(54) UNITIZING GASKET AND METHODS OF USE

(71) Applicant: Gary Sprague, Visalia, CA (US)

(72) Inventor: Gary Sprague, Visalia, CA (US)

( * ) Notice: Subject to any disclaimer, the term of this patent is extended or adjusted under 35 U.S.C. 154(b) by 1 day.

(21) Appl. No.: 16/848,581

(22) Filed: Apr. 14, 2020

(65) Prior Publication Data

US 2021/0285546 A1  Sep. 16, 2021

Related U.S. Application Data (63) Continuation-in-part of application No. 16/817,439, filed on Mar. 12, 2020, now Pat. No. 11,060,341.

(51) Int. Cl.
*F16J 15/08* (2006.01)
*E06B 3/54* (2006.01)

(52) U.S. Cl.
CPC ......... *F16J 15/0818* (2013.01); *E06B 3/5454* (2013.01)

(58) Field of Classification Search
CPC ............................... E06B 3/5454; E06B 3/549
USPC .................................................... 52/204.5
See application file for complete search history.

(56) References Cited

U.S. PATENT DOCUMENTS

| | | | | |
|---|---|---|---|---|
| 2,303,149 A * | 11/1942 | Verhagen | ................ | E06B 3/64 52/204.595 |
| 4,524,978 A * | 6/1985 | Mauser | ................ | E06B 3/305 277/637 |
| 5,282,693 A * | 2/1994 | Daily, Jr. | ................ | E01D 19/06 404/47 |
| 6,434,905 B1 * | 8/2002 | Sprague | ................ | E06B 3/02 49/501 |
| 7,493,673 B2 * | 2/2009 | Garrett | ................ | E05D 5/0246 16/252 |
| 7,963,077 B2 * | 6/2011 | Lin | ................ | E06B 3/72 52/204.597 |
| 8,266,856 B2 * | 9/2012 | Carlson | ................ | B32B 3/30 52/309.16 |
| 8,529,716 B2 * | 9/2013 | Davies | ................ | B29C 66/02242 156/71 |
| 8,800,221 B1 * | 8/2014 | Header | ................ | E04B 2/88 52/204.5 |
| 9,296,150 B2 * | 3/2016 | Deiss | ................ | E04B 1/6812 |
| 9,303,444 B1 * | 4/2016 | Choi | ................ | E06B 7/28 |
| 9,506,247 B2 * | 11/2016 | Feldpausch | ................ | E06B 1/18 |
| 9,657,760 B2 * | 5/2017 | Giacometti | ................ | F16B 2/14 |

(Continued)

FOREIGN PATENT DOCUMENTS

EP  0953714 A1 * 11/1999 ........... B29C 66/843

*Primary Examiner* — Brian D Mattei
*Assistant Examiner* — Joseph J. Sadlon
(74) *Attorney, Agent, or Firm* — Cohen IP Law Group, P.C.; Michael N. Cohen (57) ABSTRACT

A gasket for use in holding side members in proper position during assembly and use is provided. The gasket may be used with frameless door rail systems such as those used to secure heavy glass doors in residential and commercial buildings. The gasket holds the door rail clamping members in proper position during insertion into the door rail system, and in proper position during the insertion of the door or panel to be held therebetween. The gasket also provides a cushioned interface and a weather seal between the clamping members and the associated door or panel and eliminates the need for bonding of the gasket to the clamping mechanism(s).

16 Claims, 12 Drawing Sheets

(56) References Cited

U.S. PATENT DOCUMENTS

| | | | |
|---|---|---|---|
| 9,752,327 B2* | 9/2017 | Poradzisz | E04F 11/1853 |
| 2008/0295425 A1* | 12/2008 | Farag | B32B 17/10055 |
| | | | 52/235 |
| 2009/0178361 A1* | 7/2009 | Chen | B29C 48/18 |
| | | | 52/656.2 |
| 2014/0230359 A1* | 8/2014 | Honey | E06B 3/6621 |
| | | | 52/656.2 |

* cited by examiner

UNITIZING GASKET AND METHODS OF USE

RELATIONSHIPS TO PRIOR APPLICATIONS

This application is a Continuation-in-Part to U.S. patent application Ser. No. 16/817,439, filed Mar. 12, 2020, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to gaskets, including unitizing gaskets and the methods of use of such gaskets with frameless door rail systems.

BACKGROUND

Frameless door rail systems used to provide support and structure to heavy glass doors and panels are used in commercial and residential buildings throughout the world. The rail systems usually extend along one or more edges of the doors or panels (e.g., along the bottom edge) and are designed to maximize the structures' "frameless" appearance.

Some door rail systems are designed to secure the doors or panels permanently, such that if the doors or panels become broken or otherwise need replacement, the rail systems must also be replaced. This adds cost and additional labor.

Other door rail systems allow the doors or panels to be removably configured with the rail systems, such that the rail systems need not be replaced if and when replacement of the doors or panels is required. Such door rail systems typically include opposing clamping mechanisms within a door rail housing that extend along one or more edges of the doors or panels (e.g., along the bottom edge). These clamping mechanisms include opposing surfaces that are forced together to secure the doors or panels therebetween. If and when the doors or panels require removal, the clamping mechanisms may be relaxed. However, current removable door rail systems are difficult to assemble, and require the use of temporary spacing blocks placed between the clamping members to hold them apart during the placement of the door or panel. This process requires additional parts, is laborious, and requires further expertise.

In addition, these types of door rail systems require adhesive (e.g., adhesive tape and/or cement) between the gaskets and the clamping members to secure the gaskets in place. Without such adhesives, the gaskets may pull out of the clamping members along with the glass or slip laterally relative to the door rail. This adds an additional step during the installation process thus adding additional labor and cost.

Also, after installation, many door rail systems require a sealant to be applied to the interface between the clamping members and the door panel to gutter water away from the internal mechanisms of the door rail system (e.g., the fasteners) where corrosion may commonly occur, and to instead redirect the water to the ends of the rail where the water may flow downwardly between the end caps and door rail housing. This too adds extra labor and cost.

Accordingly, there is a need for a unitizing gasket for use with door rail systems that holds the clamping members in proper position during the installation of the clamps and the door or panel, that eliminates the material and labor expenses associated with bonding the gaskets to the door rail clamping mechanism, and that provides waterproofing for vital components of the system when the door or panel is secure.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

As used herein, unless used otherwise, the following terms and abbreviations have the following meanings:

Outboard means towards the outside, and in the case of a unitizing gasket, away from the median plane of the gasket to the left. Unless otherwise stated, this will typically be depicted in the FIGS as the portion of the gasket to the left of the gasket's median plane.

Inboard means towards in the inside, and in the case of a unitizing gasket, away from the median plane of the gasket to the right. Unless otherwise stated, this will typically be depicted in the FIGS as the portion of the gasket to the right of the gasket's median plane.

Lateral means towards the side, and in the case of a unitizing gasket, facing away from the middle (the median plane) of the gasket.

Medial means towards the middle, and in the case of a unitizing gasket, facing towards the middle (the median plane) of the gasket.

In general, the device according to exemplary embodiments hereof provides a gasket and its method of use. The gasket may be utilized as a unitizing gasket, as a clamping gasket and/or other types of gaskets. In some embodiments, the gasket is used within the channel of a frameless door rail system (e.g., a glass door rail system) to provide support and other benefits to the panel clamping mechanisms of the door rail system and to the door rail system itself. The benefits may be enjoyed during the assembly, use and maintenance of such door rail systems.

Referring now to FIGS. 1-8, the system 10 according to exemplary embodiments hereof will be described in further detail.

Figure 1:
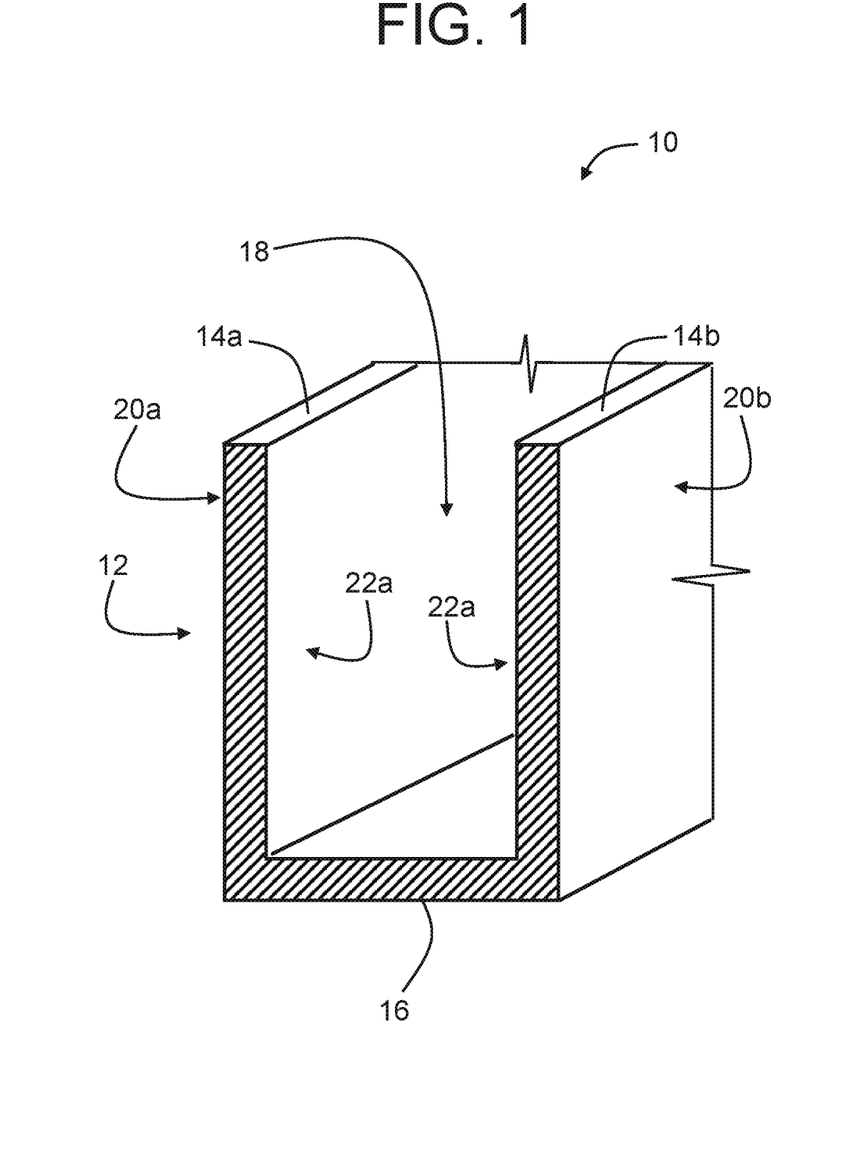
FIG. 1 shows aspects of a gasket according to exemplary embodiments hereof.

In one exemplary embodiment hereof as shown in FIG. 1, the gasket 10 includes a body 12 with an outboard portion 14a, an inboard portion 14b and a bottom 16 connecting the outboard and inboard portions 14a, 14b. The outboard portion 14a, the inboard portion 14b, and the bottom 16 define an inner channel 18 therebetween. In this way, the gasket body 12 has a generally U-shaped and/or V-shaped cross-section. The outboard portion 14a includes an outer surface 20a and in inner surface 22a, and the inboard portion 14b includes an outer surface 20b and an inner surface 22b. In some respects, the outboard portion 14a and the inboard portion 14a may be considered walls.

It should be appreciated that, as with all of the drawings herein unless otherwise specified, FIG. 1 is not drawn to scale and that relative positions and sizes of the outboard portion 14a, the inboard portion 14b and the bottom 16 are merely exemplary. It should be appreciated that, in addition to the drawings not being to scale, the edges and/or corners of the actual gasket or materials may not be rectangular (e.g., may be rounded or otherwise), and the rectangular edges and/or corners are shown in the drawings to aid in this description.

In some embodiments, the gasket 10 comprises a polymer and preferably an elastomer such as silicon. Other appropriate materials and any combinations thereof may also be used. In some embodiments, the body 12 is formed as a single piece (e.g., extruded), while in other embodiments, the portions of the gasket 10 (e.g., the outboard portion 14a, the inboard portion 14b and the bottom 16 and/or other portions) may be formed separately and combined thereafter.

Figure 2:
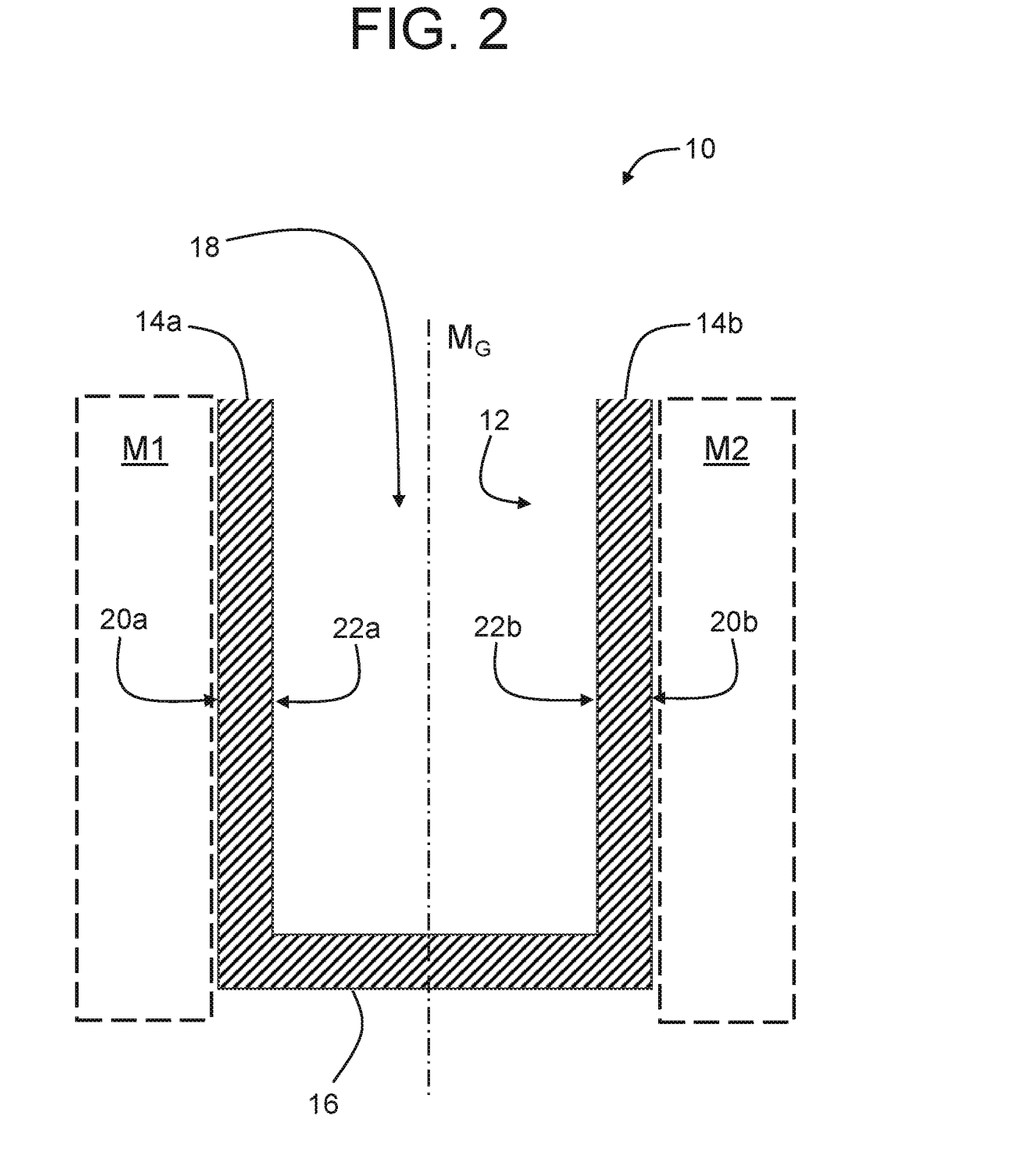
FIG. 2 shows aspects of a gasket configured with side members according to exemplary embodiments hereof.

FIG. 2 shows the cross-section of the gasket 10 configured with first and second outer members M1, M2. In some embodiments, the outboard and inboard portions 14a, 14b are opposing and generally mirror images of one another about the gasket's median plane $M_G$ with similar or equivalent geometries and thicknesses. However, the outboard and inboard portions 14a, 14b may differ in any regard as required by the application of the gasket.

As will be described in other sections, the first and second outer members M1, M2 may include objects and/or elements that may benefit from the gasket's characteristics. As shown, in some embodiments, the first member M1 may be configured with the outboard outer surface 20a of the outboard portion 14a, and the second member M2 may be configured with the outer inboard surface 20b of the inboard portion 14b. In one implementation, the gasket 10 provides lateral support to the first and second members M1, M2. In another implementation, the gasket 10 provides a waterproof interface between the first and second members M1, M2 and any additional member(s) that may be configured within the channel 18 as will be described in other sections. Other benefits also will be discussed.

Figure 3:
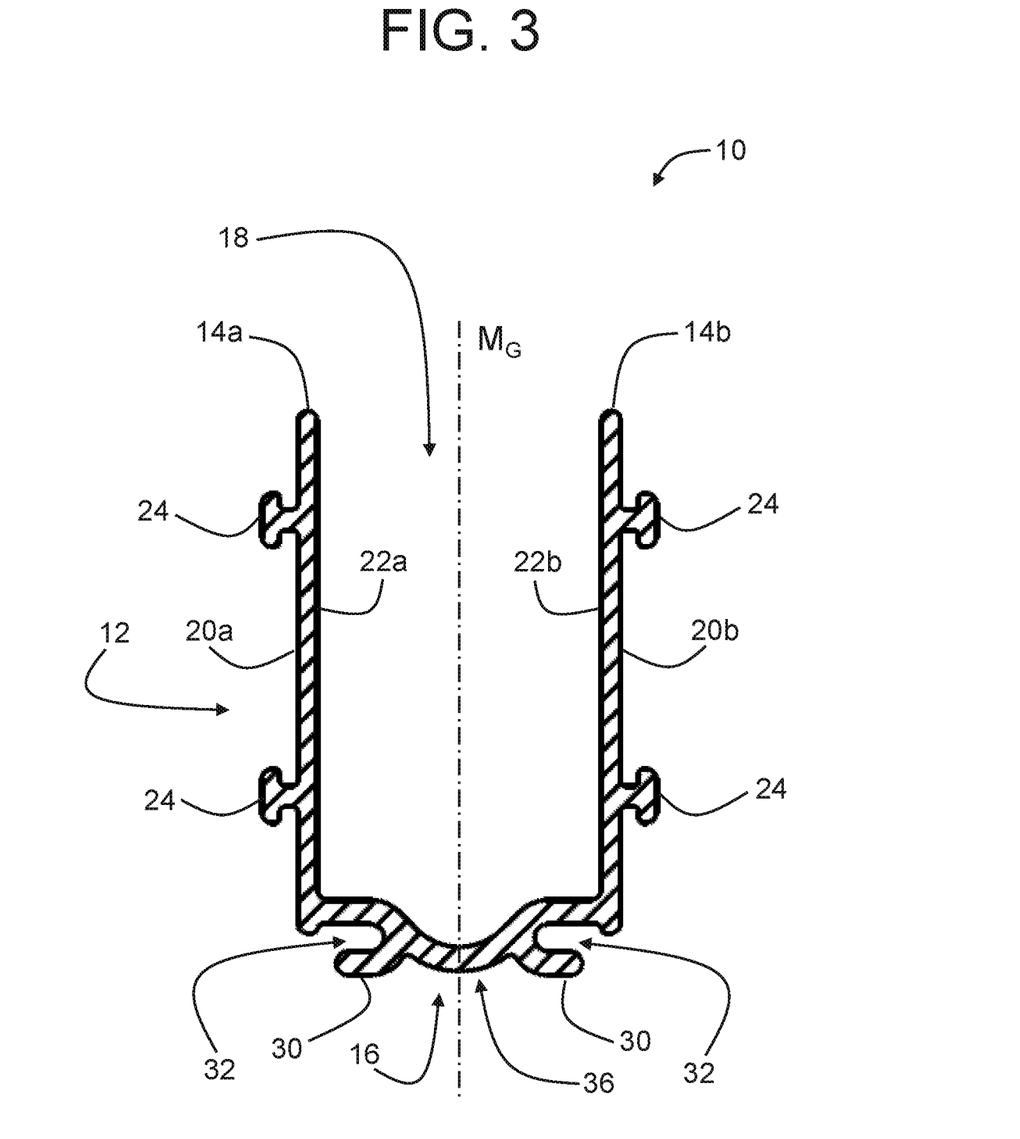
FIG. 3 shows aspects of a gasket according to exemplary embodiments hereof.
Figure 4:
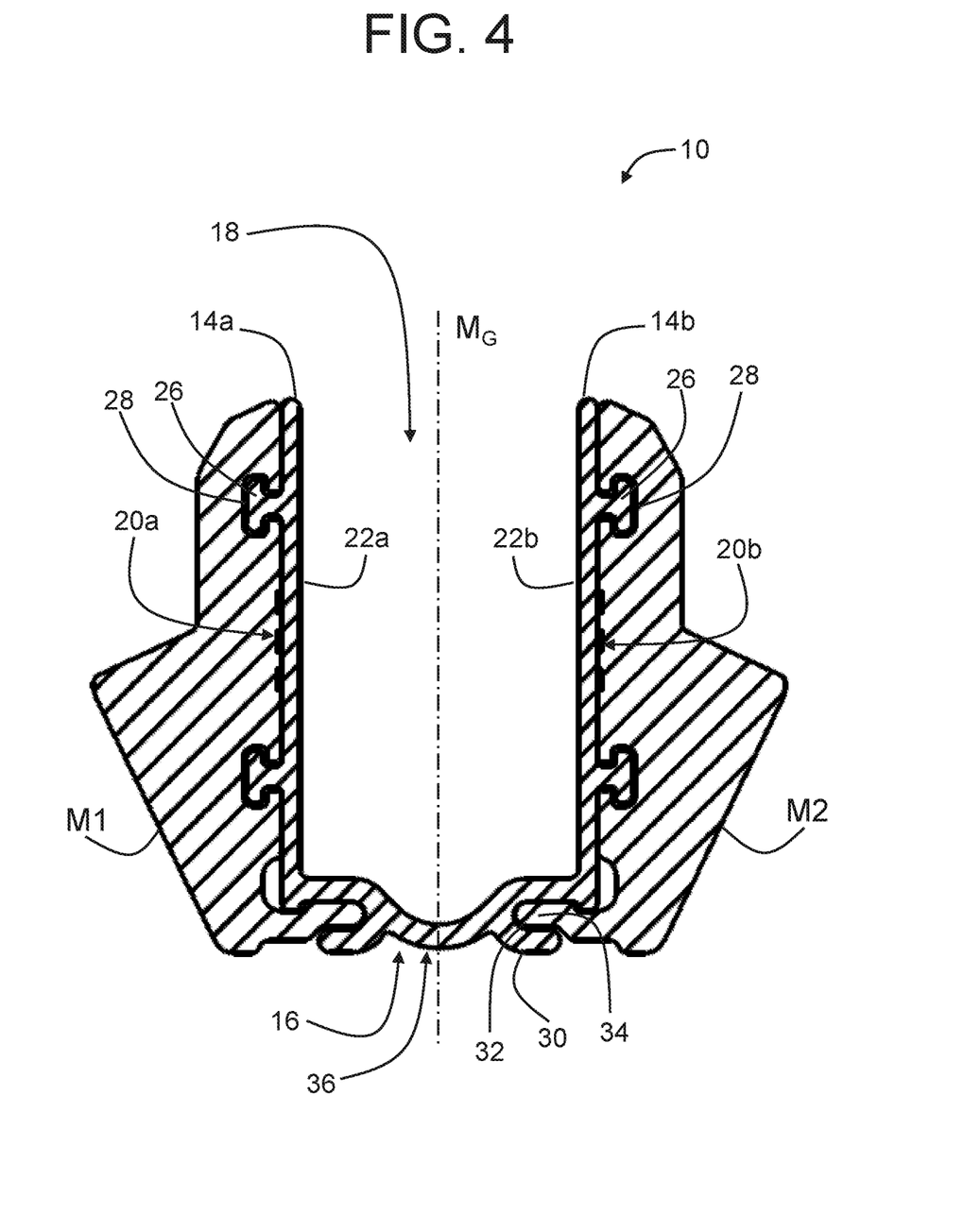
FIG. 4 shows aspects of a gasket configured with side clamping members according to exemplary embodiments hereof.

In one exemplary embodiment hereof as shown in FIGS. 3 and 4, the gasket 10 includes attachment mechanisms 24 (also referred to as an attachment member 24) that may provide attachment of the gasket 10 to the members M1 and M2. Note that the members M1 and M2 shown in FIG. 4 are represented as clamping members M1, M2 that may be included in a glass door rail system as will be described in other sections. However, it is understood that this representation is for demonstrational purposes and that the members M1 and M2 may be any type of objects and/or members that may be configured with the gasket 10. It is also understood that the scope of the gasket 10 is not limited in any way by the objects and/or members M1, M2 that it may be configured with.

In some embodiments, the attachment mechanisms 24 are configured with the outer outboard surface 20a and the outer inboard surface 20b. In this way, these surfaces 20a, 20b may be secured to the members M1, M2, respectively. In some embodiments the attachment mechanisms 24 include tabs 26 that are received into corresponding openings 28 within the members M1, M2. The tabs 26 may include any type of design that may be secured within the openings 28, such as (without limitation) dart shaped, nail-head shaped, saucer shaped, T-shaped, arrowhead shaped, other shapes and any combination thereof. The corresponding openings 28 may include inner areas adapted to receive the tabs 26 with opposing front walls to secure the tabs 26 therein. Other types of attachment mechanisms 24 may be used such as clips, clamps, double-sided tape, pressure fit, other types of attachment mechanisms and any combination thereof. It may be preferable that the attachment mechanisms 24 are adhesiveless (i.e., the attachment mechanisms 24 that do not include adhesive) so that the assembly comprising the gasket 10 and the members M1, M2 also is adhesiveless. However, while adhesiveless attachment mechanisms 24 such as those described above may be preferred, it is understood that adhesive also may be used as an attachment mechanism 24 and/or in combination with other types of attachment mechanisms 24. While FIGS. 3 and 4 depict the use of four attachment mechanisms 24 with two attachment mechanisms 24 on the outboard portion 14a and two attachment mechanisms 24 on the inboard portion 14b, it is understood that any number of attachment mechanisms 24 positioned in any adequate locations may be used as required by the application of the gasket 10.

In some embodiments, the gasket 10 includes stabilizing members 30 with corresponding stabilizing gaps 32 formed between the members 30 and the bottom 16 of the gasket. The stabilizing gaps 32 may receive a portion of a member M1, M2 that may be adapted to fit within the gaps 32 and be held and generally stabilized therein. As shown in FIGS. 3 and 4, the members M1, M2 may include inward tabs 34 that are received into the gaps 32 and secured therein. The tabs 34 may be secured within the gaps 32 using notches, detents, opposing walls, adhesive, pressure fit, other techniques and any combination thereof. In some embodiments, the tabs 34 provide support to and proper positioning of the panel P during the placement of the panel P into the channel 18 prior to the clamping process. This proper positioning prior to clamping may then translate to proper positioning after the clamping process (during which the panel P may be moved slightly upward within the channel due to the clamping forces and movements of the clamping members M1, M2).

It is preferable that with the attachment tabs 26 secured within the corresponding openings 28, and the inward tabs 34 secured within the stabilizing gaps 32, that the members M1, M2 are attached to and held tight by the gasket 10, and that the interface between the surfaces 22a, 22b and members M1, M2, respectively, is flush and free of gaps. In this way the members M1, M2 and the gasket member 10 are held together as a unit to generally form an assembly. Given this, the gasket member 10 may be referred to as a unitizing gasket 10 (as it may unitize the gasket 10 and the members M1, M2 together as a single unit). However, this may not be necessary in all implementations. Note that while FIGS. 3 and 4 depict the stabilizing members 30 and corresponding stabilizing gaps 32 as being configured with the bottom 16 of the gasket 10, these elements 30, 32 may be configured with other portions and/or areas of the gasket 10. For example, these elements 30, 32 may be configured with the upper portions of the outboard and/or inboard portions 14a, 14b, with the outer outboard portion and/or outer inboard portion surfaces 22a, 22b, and/or with any other portions of the gasket 10.

In some embodiments, the bottom portion 16 of the gasket 10 includes a shortening mechanism 36 (also referred to as a shortening portion 36) that enables the overall length of the bottom 10 (the length of the bottom 16 between the outboard portion 14a and the inboard portion 14b) to shorten during certain implementations of the gasket 10. For example, in some embodiments, one or both members M1 and M2 may be forced in an inward direction (towards the median plane $M_G$ of the gasket) and the shortening mechanism 36 may enable the bottom 16 to effectively shorten to accommodate this inward movement of the members M1, M2.

In one embodiment, the shortening mechanism 36 includes a portion of the bottom 16 that is adapted to kink or otherwise bend when the members M1, M2 are moved inward. For example, the shortening mechanism 36 may include a partial arc (an upward arc as shown in FIGS. 3 and 4, a downward arc (not shown), or otherwise) that may bend to shorten the overall length of the bottom 16 between the portions 14a, 14b. In other embodiments, the shortening mechanism 36 may include a spring-like mechanism that may compress. In other embodiments, the shortening mechanism 36 may include an accordion-like mechanism that may compress. In other embodiments, the shortening mechanism 36 may include a portion of material that may intrinsically compress to shorten the overall length of the bottom 16. Other types of shortening mechanisms 36 and any combinations thereof also may be used. It is understood that the shortening mechanism 36 may take any form that may enable the overall length of the bottom 16 to shorten when one or both members M1, M2 are moved inward, and that the scope of the gasket 10 is not limited in any way by the type of shortening mechanism 36 provided.

Figure 5:
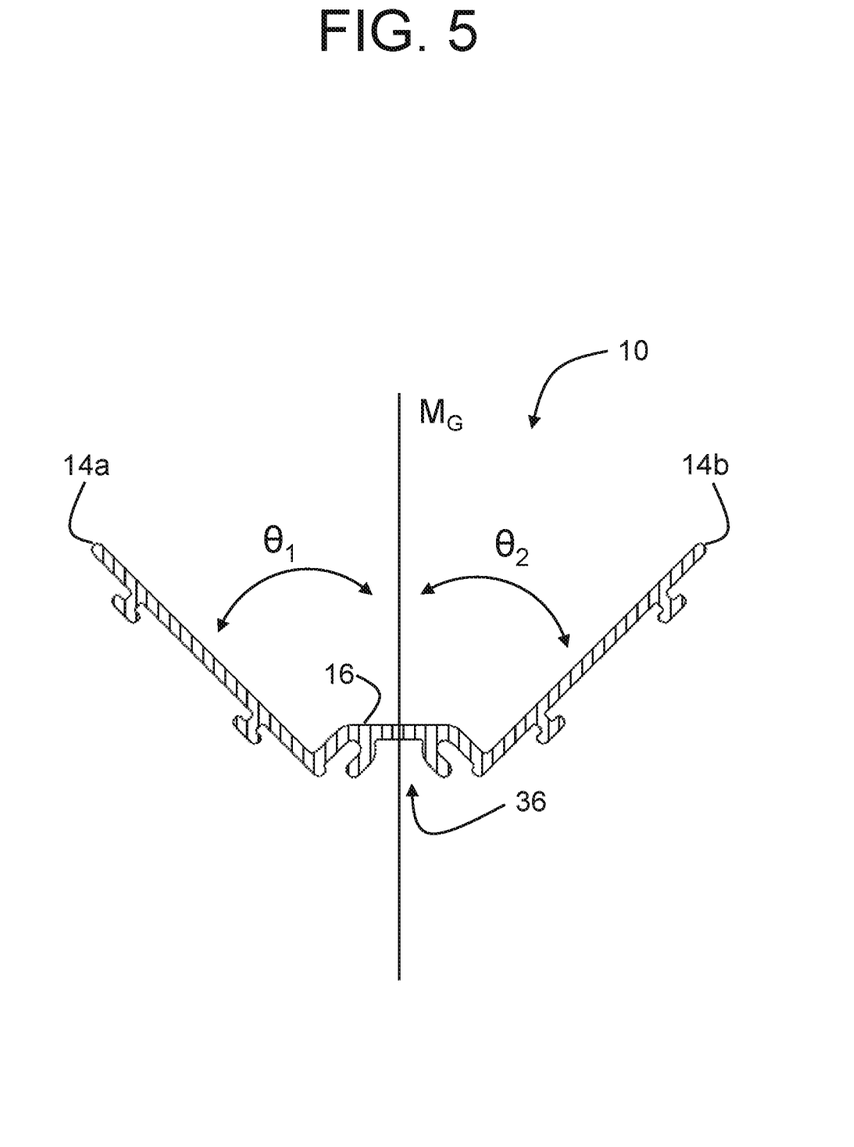
FIG. 5 show aspects of a gasket according to exemplary embodiments hereof.

In one exemplary embodiment hereof as shown in FIG. 5, the gasket 10, in its at-rest and unflexed state, includes a pre-assembly outward bias such that the gasket's outboard portion 14a and inboard portion 14b may each extend outward from the gasket's bottom 16, each at an acute angle $\theta_1$, $\theta_2$, respectively, with respect to the gasket's median plane $M_G$. This outward bias may provide an outward force applied by the gasket portions 14a, 14b to the members M1, M2, respectively, when configured as such. Note that $\theta_1$ and $\theta_2$ need not match. The functionality and benefits of the bias will be described in detail in other sections.

Additional embodiments and details of the gasket 10 will be described by way of several detailed in-use examples. The examples provided below are chosen to illustrate various embodiments and implementations of the gasket 10, and those of ordinary skill in the art will appreciate and understand, upon reading this description, that the examples are not limiting and that the gasket 10 may be used in different ways. It is also understood that details of different embodiments described in different examples may be combined in any way to form additional embodiments that are all within the scope of the gasket 10.

In one exemplary embodiment hereof, the gasket 10 is used as a component of a glass door rail system 100. As is known in the art, a door rail system includes a longitudinal channel within which a glass door may be removably mounted and secured. It is understood that the door rail system also may be used for other types of structures such as glass panes and/or other types of panels. It is also understood that the system may be used to provide support to structures comprising materials other than glass.

Such a door rail system is described in U.S. patent application Ser. No. 16/817,439, filed Mar. 12, 2020, the entire contents of which are hereby fully incorporated herein by reference for all purposes.

Figure 6:
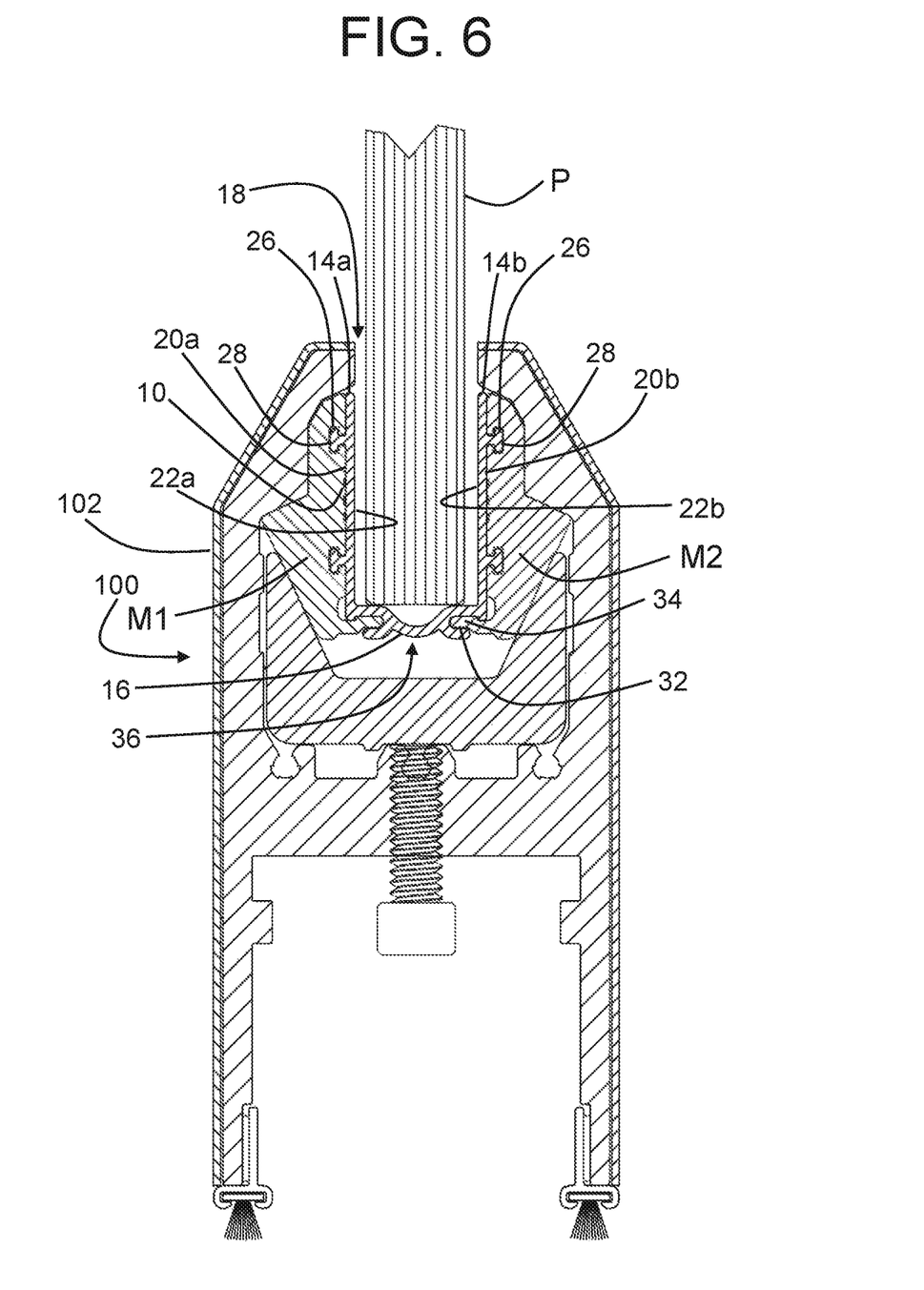
FIGS. 6-11 show aspects of a gasket configured with a door rail system according to exemplary embodiments hereof.

FIG. 6 depicts the gasket 10 configured within the housing 102 of a door rail system 100 in an unclamped configuration with a panel P (e.g., a glass door panel). As shown, the outboard and inboard outer surfaces 20a, 20b of the gasket 10 are configured with the corresponding surfaces of the clamping members M1, M2, respectively. (Clamping members M1, M2 are each elements of the door rail system 100.) The panel P is positioned within the channel 18, preferably with the bottom of the panel P abutted with the top of the gasket's bottom 16 within the channel 18.

It is preferable that the footprint of outer surface 20a (e.g., the height) generally match that of the corresponding surface of clamping member M1, and that the footprint of outer surface 20b (e.g., the height) generally match that of the corresponding surface of clamping member M2 as shown. However, this may not be necessary. It is understood that the gasket 10 may extend along the entire longitudinal length of the door rail housing 102 and/or the clamping members M1, M2, and/or along any portions thereof.

Being in an unclamped configuration, the gasket's outboard and inboard inner surfaces 22a, 22b are preferably not in contact with the corresponding sides of the panel P. Accordingly, the gasket 10 may generally hold the clamping members M1, M2 apart and in proper position within the housing 102 of the door rail system 100 for the insertion of the panel P into the channel 18. Note that it may be preferable that the width of the channel 18 be chosen to be slightly larger than the width of the panel P that may be installed therein so that the panel P may be installed without obstruction. It is understood that the scope of the gasket 10 is not limited by the width of the channel 18, and that the width of channel 18 may be chosen dependent on the application of the gasket 10.

As described above with reference to FIG. 5, the gasket 10 may include an intrinsic outward bias that may provide outward forces to both members M1, M2, thereby supporting the clamping members M1, M2 in the unclamped configuration and keeping the channel 18 adequately open for the insertion of the panel P. This may eliminate the need for temporary spacer blocks to hold the channel 18 open during the insertion of the panel P. This also may be beneficial during assembly of the door rail system 100 onto a horizontally oriented glass panel P by counteracting the forces of gravity on the clamping members M1, M2 thereby holding them open for the insertion of the panel P.

To secure the panel P within the housing 102 of the door rail system 100, inward forces are applied to the clamping members M1, M2 causing them to move towards one another (towards the panel P). During this clamping process, the unitizing gasket 10 holds the clamping members M1, M2 in proper position. As the clamping members M1, M2 move inward, the outboard and inboard inner surfaces 22a, 22b come into contact with the corresponding sides of the panel P to effectively clamp the panel P within the channel 18 and within the housing 102. This is depicted in FIG. 7.

Figure 7:
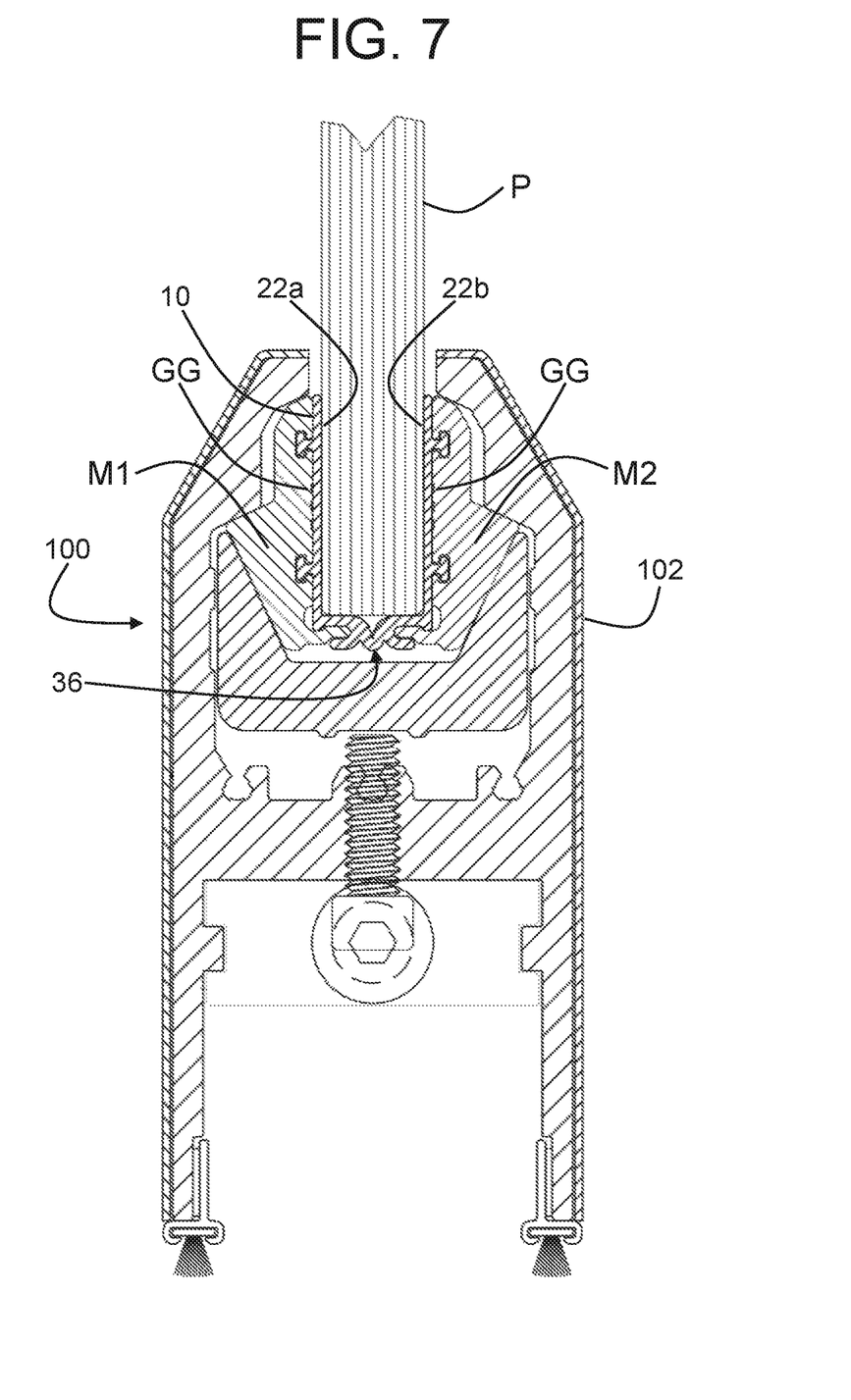

Also shown in FIG. 7 are gripping grooves GG configured with the inner surfaces of the gripping members M1, M2 in contact with the outboard and inboard outer surfaces 20a, 20b, respectively. Said gripping grooves GG may preferably extend horizontally along the longitudinal length of the clamping members M1, M2. As the clamping members M1, M2 become clamped onto the panel P, the outboard and inboard outer surfaces 20a, 20b (being malleable) may press into the gripping grooves GG and become held therein. This may provide additional attachment of the gasket 10 to the members M1, M2, especially during the clamping process.

In some cases, the clamping members M1, M2 also may move slightly upward within the housing 102, and the gasket 10 may accommodate this by supporting and holding the clamping members M1, M2 in proper position during this movement. Accordingly, it may be preferable that the attachment mechanisms 24 and/or gripping grooves GG provide adequate shear strength to resist being inadvertently removed by the clamping process to the panel P.

As shown in FIG. 7, the gasket's shortening mechanism 36 is activated during the inward movement of the clamping members M1, M2 such that the overall length of the gasket's bottom 16 (between gasket portions 14a and 14b) is shortened thereby accommodating the movement of the members M1, M2. In this representation, the shortening mechanism 36 includes an arc of material that has kinked and/or compressed and/or has become folded over itself in order to shorten the length of the bottom 16. However, it is understood that this representation is for demonstration and that the gasket 10 may include any type of adequate shortening mechanism 36.

Once the panel P is adequately secured between the gasket's outboard and inboard inner surfaces 22a, 22b, the gasket 10 provides a waterproof seal between the clamping members M1, M2 and the corresponding sides of the panel P. The unitizing gasket 10 also provides a cushioned yet gripping interface between the clamping members M1, M2 and the panel P.

Figure 8:
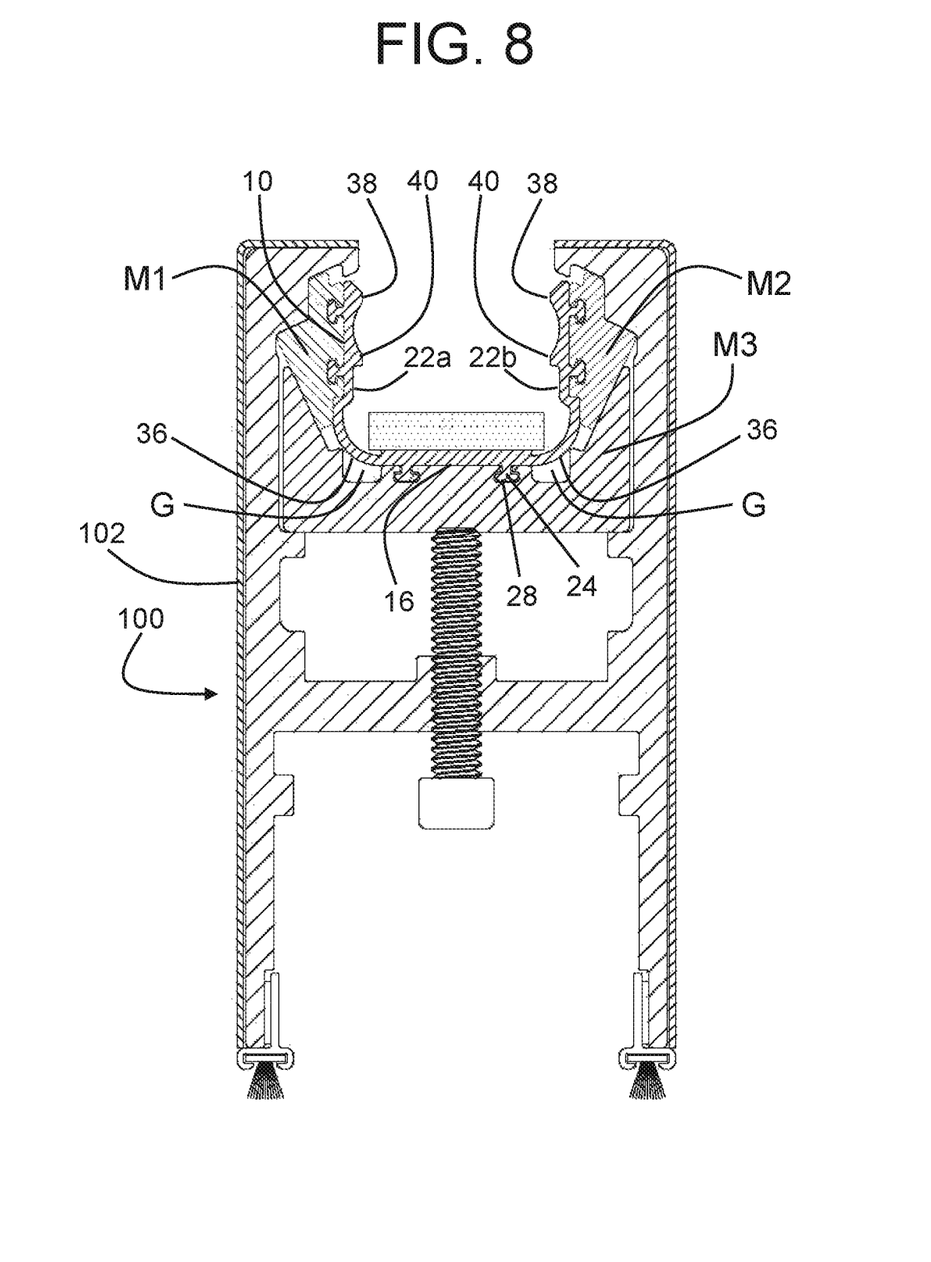

FIG. 8 depicts the unitizing gasket 10 configured with clamping members M1, M2 in another door rail system 100. In this depiction, the gasket 10 includes upper C-shaped seals 38 and lower C-shaped seals 40 on its outboard and inboard inner surfaces 22a, 22b. These seals 38, 40 provide a concentration of pressure, and cushion for insulating glass applications where overall clamping force must be limited to preserve the integrity of layers (e.g., sealant layers) within the panel. In addition, these C-shaped seals 38, 40 may further facilitate a waterproof seal between the panel P and the clamping members M1, M2 when the panel P is secured by the door rail system 10.

Note also that in addition to the side attachment mechanisms 24, the gasket 10 includes attachment mechanisms 24 configured with its bottom 16 that are received within openings 28 configured with an additional member M3 (e.g., the upward moving control mechanism of the door rail system 100). In addition, in this embodiment, the shortening mechanisms 36 include arcs and associate gaps G configured between the outboard portion 14a and the bottom 16 of the gasket 10, and between the inboard portion 14b and the bottom 16 of the gasket 10 (on the lower left and right). These shortening mechanisms 36 (arcs) may flex, bend and/or compress into the associated gaps G to accommodate the inward movement of the clamping members M1, M2. By compressing into the associated gaps G, the shortening mechanisms 36 may mitigate any catching of the bottom edges of the panel P with the bottom 16 of the gasket 10, and any bunching of the bottom of the gasket 10 thereby.

Figure 9:
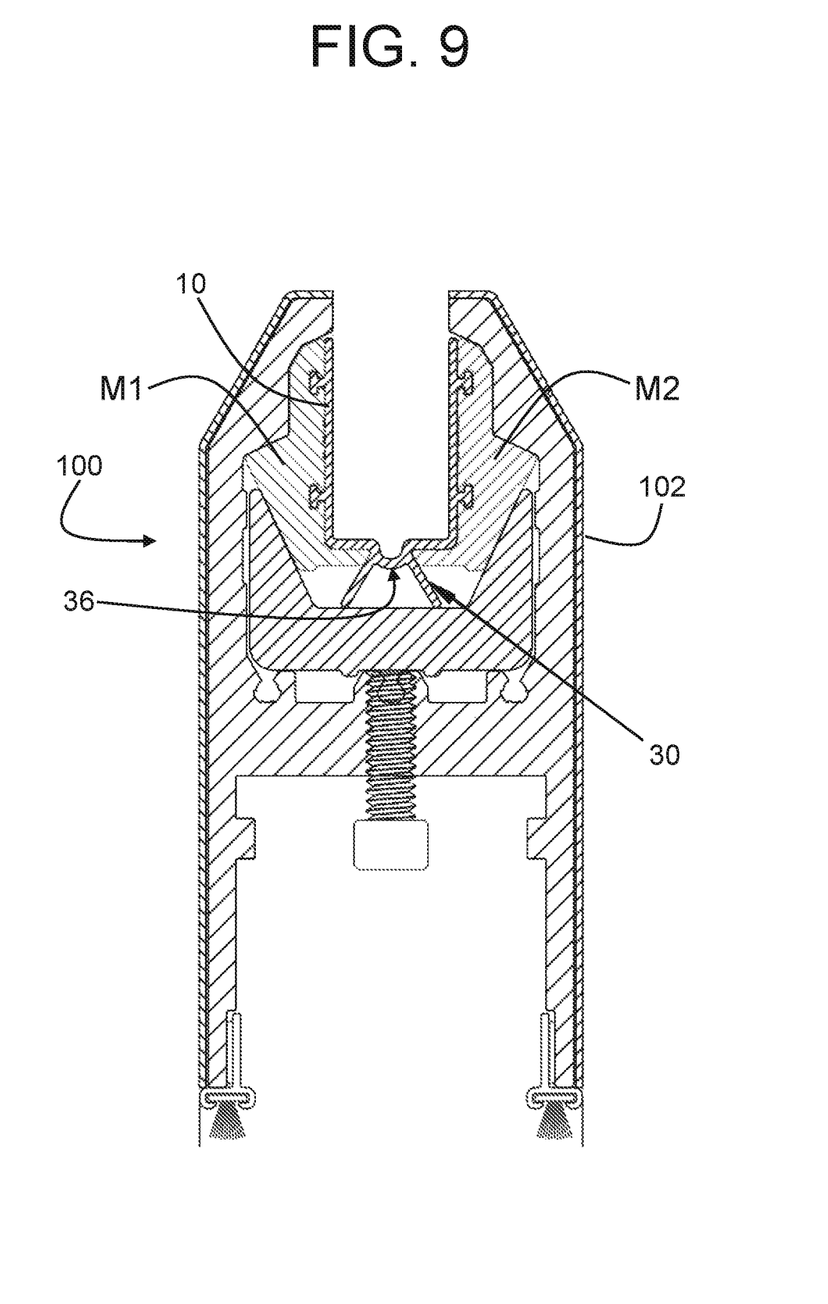

FIG. 9 depicts the unitizing gasket 10 configured with clamping members M1, M2 in a door rail system 100 similar to the door rail system 100 of FIG. 7. In this embodiment, the gasket 10 includes stabilizing members 30 that extend downward at acute outward angles with respect to the bottom 16. In this way, the stabilizing members 30 may act as spacers that may provide vertical support to the clamping members M1, M2. Note that the stabilizing members 30 may be flexible so that the members 30 may flex outward if the members M1, M2 require a lower position within the housing 102 (e.g., as shown in FIG. 10).

Figure 10:
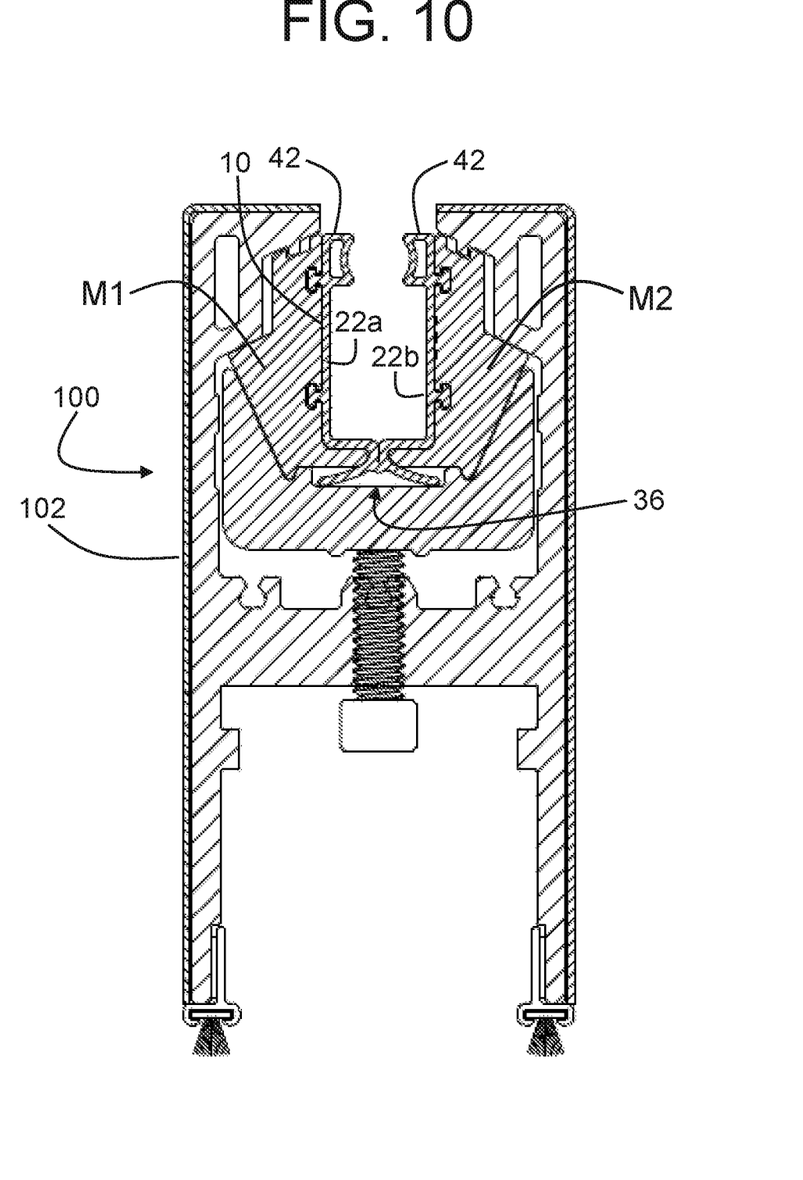

FIG. 10 depicts the unitizing gasket 10 configured with clamping members M1, M2 in another door rail system 100. In this depiction, the gasket 10 includes upper bulb seals 42 on its outboard and inboard inner surfaces 22a, 22b. These bulb seals 42 may include hollow sections and may further facilitate a waterproof seal between the panel P and the clamping members M1, M2 when the panel P is secured by the door rail system 10.

Figure 11:
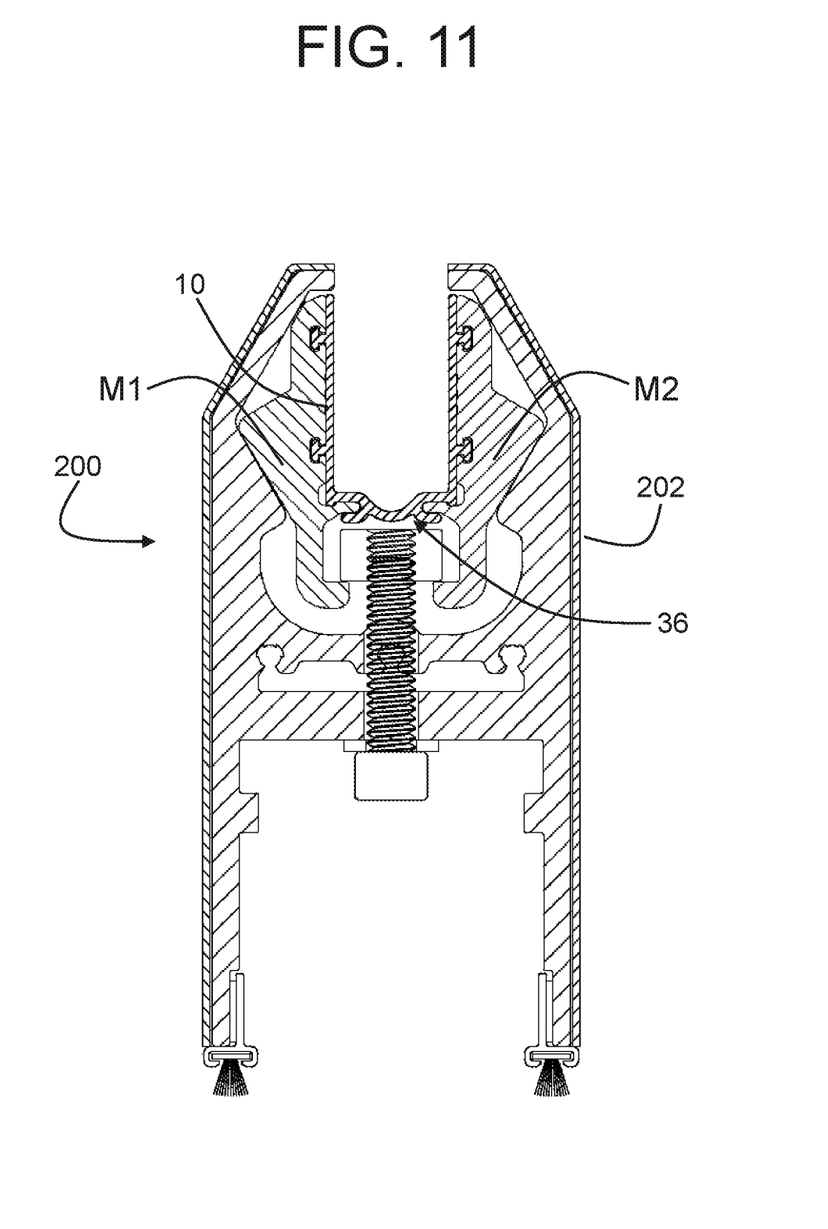

FIG. 11 depicts the unitizing gasket 10 configured with clamping members M1, M2 in another door rail system 100. Note that while the embodiments of FIGS. 6-10 depict the gasket 10 configured with door rail systems 100 that employ an upward movement of the clamping members M1, M2 to translate an inward clamping motion onto the panel P, FIG. 11 depicts the gasket configured with a door rail system 100 that employs a downward movement of the clamping members M1, M2 to translate an inward clamping motion of the clamping members M1, M2 onto the panel P. In any event, the functionality of the unitizing gasket 10 is generally the same.

Figure 12:
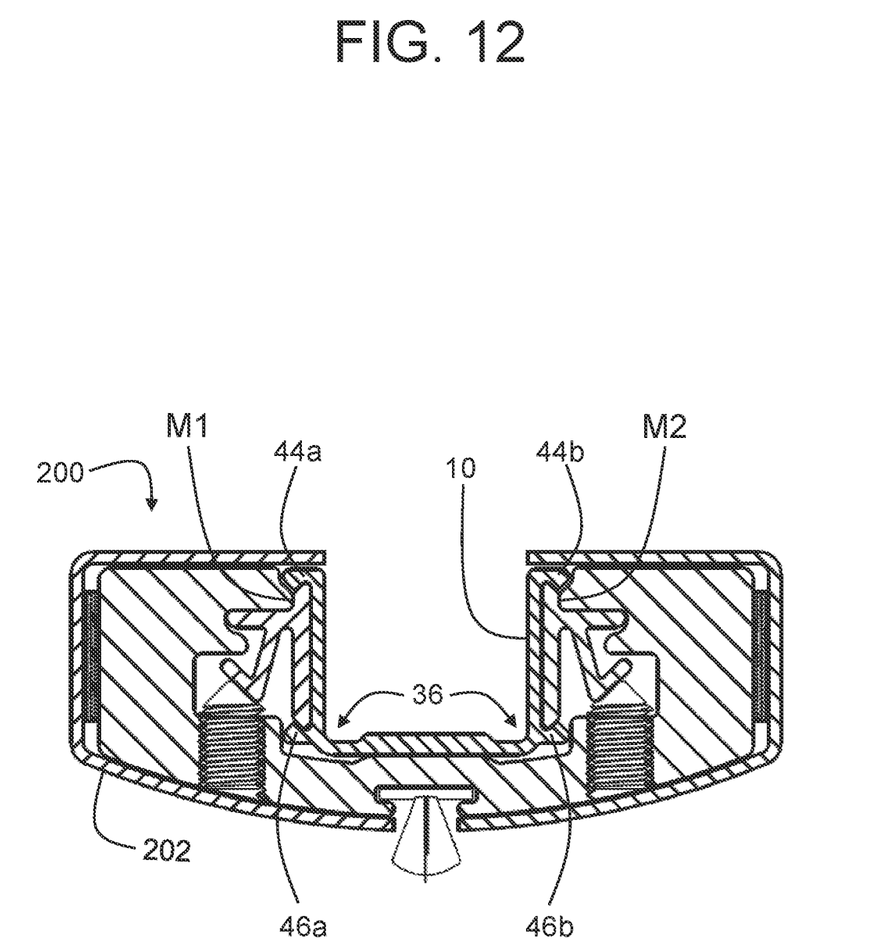
FIG. 12 show aspects of a gasket configured with a door stile system according to exemplary embodiments hereof.

FIG. 12 depicts the unitizing gasket 10 configured with clamping members M1, M2 in a vertical door stile system 200. The vertical door stile system 200 includes a door stile system housing 202 as shown. In this embodiment, the gasket 10 includes attachment mechanisms 24 in the form of outboard and inboard upper tabs 44a, 44b, respectively, and outboard and inboard lower tabs 46a, 46b, respectively. As shown, outboard upper tab 44a and outboard lower tab 46a are adapted to bookend and hold therebetween a portion of the clamping member M1 (e.g., the vertical clamping wall of clamping member M1), and inboard upper tab 44b and inboard lower tab 46b are adapted to bookend and hold therebetween a portion of the clamping member M2 (e.g., the vertical clamping wall of clamping member M2). In this way, the unitizing gasket 10 may be secured to clamping mechanisms M1 and M2. Note that the shortening mechanisms 36 of this embodiment are similar to the shortening mechanisms 36 of the embodiment of FIG. 8 with similar functionality.

In some embodiments, the preferred wall thickness range of the unitizing gasket 10 is between 0.040" and 0.050" as this may mitigate the loss of clamping range due to compression of the gasket material, and reduce the amount of compression set (i.e., loss of resilient outward force that reduces the thickness of the wall after compressive forces are removed). However, it is understood that other gasket wall thickness ranges may be used, and that the scope of the gasket 10 is not limited in any way by the thickness of its walls. For example, the gasket wall thickness may range from 0.010" to 0.10". In addition, gasket wall thicknesses greater than 0.10" and/or less than 0.010" may be used in some applications.

In some preferred embodiments, the unitizing gasket 10 comprises silicone material for its resistance to compression set, along with its high heat stability and chemical resistance. However, it is understood that the gasket 10 may comprise any adequate material and that the scope of the gasket 10 is not limited in any way by the material(s) it comprises.

Benefits of the System

The benefits of the gasket 10 are multifold and include, without limitation:

First, when used with a door rail system 100, the unitizing gasket 10 holds the door clamping members M1, M1 in proper relation to one another for the insertion of the clamping members M1, M2 into the door rail housing 102.

Second, when used with a door rail system 100, the unitizing gasket 10 holds the door clamping members M1, M2 in proper relation to one another with an adequate gap therebetween (channel 18) for the loading of the panel P into the channel 18 for subsequent clamping of the panel P. This also eliminates the need for the use of temporary spacer blocks.

Third, when used with a door rail system 100, the unitizing gasket 10 provides a cushioned yet gripping interface between the clamping members M1, M2 and the panel P when clamped.

Fourth, when used with a door rail system 100, the unitizing gasket 10 minimizes the need for adhesives within the door rail system 100 (e.g., between the unitizing gasket 10 and the clamping members M1, M2, between the panel P and the clamping members M1, M2, etc.).

Fifth, when used with a door rail system 100, the unitizing gasket 10 provides a weather seal between the rail system 100 and the panel P.

It is understood that the benefits shown above are meant for demonstration and that other benefits of the system 10 may also exist. Those of ordinary skill in the art will appreciate and understand, upon reading this description, that embodiments hereof may provide different and/or other advantages, and that not all embodiments or implementations need have all advantages.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A gasket for supporting a first object and a second object, the gasket comprising:
    a first side portion, a second side portion opposing the first side portion, and a bottom portion connecting the first and second side portions;
    a channel defined by the first side portion, the second side portion and the bottom portion;
    a first attachment member configured with a first side of the first side portion opposite the channel and adapted to mate the first side with the first object; and
    a second attachment member configured with a second side of the second side portion opposite the channel and adapted to mate the second side with the second object;
    wherein the first attachment member is configured with the first object and the second attachment member is configured with the second object, and the gasket supports the first and second objects;
    wherein the gasket is configured with a door rail system and/or a door stile system, and the first object includes a first movable clamping member, and the second object includes a second movable clamping member;
    wherein the bottom of the gasket includes a shortening portion adapted to shorten upon movement of the first and/or second clamping members.

2. The gasket of claim 1 wherein a mating of the first side of the first side portion with the first object and/or a mating of the second side of the second side portion with the second object is adhesiveless.

3. The gasket of claim 1 wherein the first attachment member includes a first tab and the first object includes a first opening adapted to receive the first tab, and wherein the second attachment member includes a second tab and the second object includes a second opening adapted to receive the second tab.

4. The gasket of claim 1 wherein the door rail system and/or the door stile system is adapted to secure a panel between the first and second clamping members, and the gasket is adapted to provide an interface between the panel and the first and second clamping members.

5. The gasket of claim 4 wherein the first side portion is adapted to provide a first interface between a first side of the panel and the first clamping member, and the second side portion is adapted to provide a second interface between a second side of the panel and the second clamping member.

6. The gasket of claim 5 wherein the first and second interfaces are adhesiveless.

7. The gasket of claim 1 wherein the first portion and/or the second portion includes an outward bias.

8. The gasket of claim 1 wherein the gasket comprises silicon.

9. A gasket for supporting a first object and a second object, the gasket comprising:
    a first side portion, a second side portion opposing the first side portion, and a bottom portion connecting the first and second side portions;
    a channel defined by the first side portion, the second side portion and the bottom portion; and
    at least one attachment member adapted to mate the gasket with the first object and/or with the second object;
    wherein the gasket is configured with a door rail system and/or a door stile system, and the first object includes a first movable clamping member, and the second object includes a second movable clamping member;
    wherein the bottom of the gasket includes a shortening portion adapted to shorten upon movement of the first and/or second clamping members.

10. The gasket of claim 9 wherein a mating of the gasket with the first object and/or with the second object is adhesiveless.

11. The gasket of claim 9 wherein the at least one attachment member includes at least one tab and the first object and/or the second object includes a first opening adapted to receive the at least one tab.

12. The gasket of claim 9 wherein the door rail system and/or the door stile system is adapted to secure a panel between the first and second clamping members, and the gasket is adapted to provide an interface between the panel and the first and second clamping members.

13. The gasket of claim 12 wherein the first side portion is adapted to provide a first interface between a first side of the panel and the first clamping member, and the second side portion is adapted to provide a second interface between a second side of the panel and the second clamping member.

14. The gasket of claim 13 wherein the first and second interfaces are adhesiveless.

15. The gasket of claim 9 wherein the first portion and/or the second portion includes an outward bias.

16. The gasket of claim 9 wherein the gasket comprises silicon.

* * * * *